United States Patent
Pang

(10) Patent No.: US 10,768,602 B2
(45) Date of Patent: Sep. 8, 2020

(54) CURVE VELOCITY PLANNING METHOD, DEVICE, AND NUMERICAL CONTROL MACHINING ROUTE DATA PROCESSING METHOD THEREOF

(71) Applicant: SHENZHEN A&E INTELLIGENT TECHNOLOGY INSTITUTE CO., LTD., Shenzhen, Guangdong Province (CN)

(72) Inventor: Huachong Pang, Shenzhen (CN)

(73) Assignee: SHENZHEN A&E INTELLIGENT TECHNOLOGY INSTITUTE CO., LTD., Shenzhen, Guangdong Province (CN)

( * ) Notice: Subject to any disclaimer, the term of this patent is extended or adjusted under 35 U.S.C. 154(b) by 551 days.

(21) Appl. No.: 15/550,754

(22) PCT Filed: Jan. 29, 2016

(86) PCT No.: PCT/CN2016/072703
§ 371 (c)(1),
(2) Date: Dec. 11, 2017

(87) PCT Pub. No.: WO2016/127826
PCT Pub. Date: Aug. 18, 2016

(65) Prior Publication Data
US 2018/0088551 A1    Mar. 29, 2018

(30) Foreign Application Priority Data

Feb. 11, 2015 (CN) .......................... 2015 1 0072415

(51) Int. Cl.
G05B 19/19   (2006.01)
G05B 19/4103   (2006.01)
G05B 19/416   (2006.01)

(52) U.S. Cl.
CPC ......... *G05B 19/19* (2013.01); *G05B 19/4103* (2013.01); *G05B 19/416* (2013.01);
(Continued)

(58) Field of Classification Search
None
See application file for complete search history.

(56) References Cited

U.S. PATENT DOCUMENTS

| | | | |
|---|---|---|---|
| 2011/0087375 A1 | 4/2011 | Aurnhammer et al. | |
| 2016/0124981 A1* | 5/2016 | Jiang ................... | G05B 19/4093 707/821 |

FOREIGN PATENT DOCUMENTS

| | | |
|---|---|---|
| CN | 101493687 A | 7/2009 |
| CN | 104238458 A | 12/2014 |

(Continued)

*Primary Examiner* — Mohammad Ali
*Assistant Examiner* — Saad M Kabir
(74) *Attorney, Agent, or Firm* — Cheng-Ju Chiang

(57) ABSTRACT

A method and a device for curve velocity planning based on NURBS (non-uniform rational B-splines) curve interpolation as well as a numerical control machining route data processing method using NURBS curve interpolation velocity planning are provided. The method includes: obtaining numerical control machining route data with a NURBS curve; obtaining an acceleration within a parameter step length on the NURBS curve; comparing each the acceleration with a maximum allowable acceleration to determine an acceleration sensitive point and an acceleration sensitive interval; determining an intermediate point of the acceleration sensitive interval as a demarcation point of the acceleration and the deceleration; calculating a velocity value of the intermediate point as a target velocity; and planning the acceleration and deceleration of the acceleration sensitive
(Continued)

interval based on the target velocity to obtain the numerical control machining route data with the planned NURBS curve.

12 Claims, 8 Drawing Sheets

(52) U.S. Cl.
CPC .............. *G05B 2219/34141* (2013.01); *G05B 2219/37347* (2013.01)

(56) References Cited

FOREIGN PATENT DOCUMENTS

| | | |
|---|---|---|
| CN | 104331025 A | 2/2015 |
| CN | 104678899 A | 6/2015 |

* cited by examiner

US 10,768,602 B2

CURVE VELOCITY PLANNING METHOD, DEVICE, AND NUMERICAL CONTROL MACHINING ROUTE DATA PROCESSING METHOD THEREOF

CROSS-REFERENCE TO RELATED APPLICATIONS

The present application is a 35 U.S.C. § 371 National Phase conversion of International (PCT) Patent Application No. PCT/CN2016/072703 filed Jan. 29, 2016, which claims foreign priority of Chinese Patent Application No. 201510072415.4, filed on Feb. 11, 2015 in the State Intellectual Property Office of China, the contents of all of which are hereby incorporated by reference.

TECHNICAL FIELD

Embodiments of the present disclosure generally relate to numerical control machining, and in particular relate to a method and device for planning curve velocity based on NURBS curve interpolation as well as a numerical control machining route data processing method using NURBS curve interpolation velocity planning.

BACKGROUND

In a numerical control machining system, CAM (computer aided manufacturing) software often divides complex curves into small lines as interpolation trajectories of the numerical control machining system. In recent years, CAM has gradually used NURBS (non-uniform rational B-splines) curve to simulate the complex curves, and transmits the parameters of NURBS to the numerical control machining system as interpolation data, which greatly reduces the delivery of transmitted files, and since the frequent acceleration and deceleration are reduced, the machining efficiency is much higher than the small line machining, therefore NURBS interpolation is becoming to the mainstream of numerical control machining.

Since the curvature of the NURBS curve is changed non-linearly, it is necessary to calculate the interpolation velocity and the acceleration in real time during machining so as to avoid exceeding the machining error limitations and machine acceleration capability limitations. Although the existing interpolation algorithms are usually capable of interpolating the acceleration segments under the limitation of the allowable maximum velocity curve, these algorithms will not consider about the velocity sudden change in the deceleration phase, which results in that the acceleration exceeds the limitation of maximum centripetal acceleration.

Therefore, in the prior art, the acceleration in the deceleration phase is prevented from exceeding the limitation through backtracking method or bidirectional acceleration method. However, when using the backtracking method, the amount of backtracking calculations for obtaining a velocity curve that meeting the acceleration requirements is unpredictable, and there is no feasible method to estimate the end velocity of the acceleration phase at each retrace, which can merely explore through multiple calculations. At the same time, the interpolation point has to be recalculated after backtracking, and the velocity of the interpolation point should be re-estimated, hence the algorithm is computationally intensive and very time-consuming, which cannot ensure to complete the backtracking and recalculation of multiple interpolation points in a single interpolation cycle, so it's application in real-time interpolation is limited. When using the bidirectional acceleration method, a larger initial velocity difference between two ends will cause the side of larger initial velocity to stop interpolation and wait for the other side's interpolation, until the interpolation velocity of the other side satisfies the requirements to meet. Since the interpolation of the two directions are started at the same time, if the positive interpolation needs to wait the reverse interpolation for more than one cycle in a real machining process, the velocity and the position of the positive interpolation cannot be controlled, hence the algorithm cannot be used in this case.

SUMMARY

The technical problem to be solved is to provide a method and device for curve velocity planning based on NURBS curve interpolation as well as a numerical control machining route data processing method using NURBS curve interpolation velocity planning, which is capable of calculating interpolation points of the acceleration in a deceleration phase which exceeds the limitation in advance so as to avoid the excessive end velocity in an acceleration phase causing the acceleration to exceed the limitation.

In order to solve the above problem, the present disclosure provides a numerical control machining route data processing method, including: obtaining numerical control machining route data that includes a NURBS curve; obtaining an acceleration $a_i$ within a parameter step length $\Delta u_i$ on the NURBS curve; comparing the acceleration $a_i$ of everywhere of the NURBS curve with a maximum allowable acceleration to determine an acceleration sensitive point and determining an acceleration sensitive interval based on the determined acceleration sensitive point; determining an intermediate point of the acceleration sensitive interval as a demarcation point of the acceleration and the deceleration within the sensitive interval; calculating a velocity value of the intermediate point as a target velocity; and planning the acceleration and deceleration of the acceleration sensitive interval based on the target velocity to obtain the numerical control machining route data with the planned NURBS curve.

In one embodiment, the method for comparing the acceleration of everywhere of the NURBS curve with the maximum allowable acceleration to determine the acceleration sensitive point and determining the acceleration sensitive interval based on the determined acceleration sensitive point includes: calculating a curvature $1/\rho_i$ of everywhere of the NURBS curve and determining a maximum allowable velocity curve based on a constraint condition of a chord height error $\delta_{max}$ and a constraint condition of a centripetal acceleration $a_{max}$; and calculating the acceleration within each parameter step length $\Delta u_i$, determining an end point of the parameter step length $\Delta u_i$ corresponding to the acceleration $a_i$ with a minimum difference from the maximum allowable acceleration as the acceleration sensitive point when the acceleration $a_i$ within the parameter step length $\Delta u_i$ is greater than the maximum allowable acceleration and the acceleration $a_{i+n}$ within the parameter step length $\Delta u_{i+n}$ is smaller than the maximum allowable acceleration, and determining the acceleration sensitive interval based on the determined acceleration sensitive point.

In one embodiment, the method for planning the acceleration and deceleration of the acceleration sensitive interval based on the target velocity to obtain the numerical control machining route data with the planned NURBS curve includes: determining whether one or more parameters corresponding to an interpolation point has entered the acceleration sensitive interval; and accelerating from a side point of the acceleration sensitive interval taken as a start point to the intermediate point, and decelerating from the intermediate point to another side point of the acceleration sensitive interval taken as an end point when the one or more parameters corresponded by the interpolation point are determined to have entered the acceleration sensitive interval.

In order to solve the above problem, the present disclosure further provides a velocity control method based on NURBS curve interpolation, including: calculating a curvature $1/\rho_i$ of everywhere of the NURBS curve and determining a curve of a maximum allowable velocity based on a constraint condition of a chord height error $\delta_{max}$ and a constraint condition of a centripetal acceleration $a_{max}$; calculating an acceleration within each parameter step length $\Delta u_i$ and determining an end point of the parameter step length $\Delta u_i$ corresponding to the acceleration $a_i$ with a minimum difference from a maximum allowable acceleration as the acceleration sensitive point when the acceleration $a_i$ within the parameter step length $\Delta u_i$ is greater than the maximum allowable acceleration and the acceleration $a_{i+n}$ within the parameter step length $\Delta u_{i+n}$ is smaller than the maximum allowable acceleration; dividing the curve of the maximum allowable velocity into a plurality of segments at a minimum value, determining a corresponding parameter value $u_{mid}$ according to an intermediate point of an acceleration sensitive interval of each of the velocity curve segments, and calculating a velocity value of the intermediate point; determining whether a parameter u corresponding to an interpolation point has entered the acceleration sensitive interval; and accelerating from a side point of the acceleration sensitive interval taken as a start point to the intermediate point, and decelerating from the intermediate point to another side point of the acceleration sensitive interval taken as an end point when the parameter u corresponded by the interpolation point is determined to have entered the acceleration sensitive interval, wherein an acceleration of the intermediate point is 0.

In one embodiment, the acceleration $a_i$ within each parameter step length $\Delta u_i$ is calculated through the following formula:

first formula:

$$a_i = \frac{v_{i+1}^2 - v_i^2}{2s_i} \approx \frac{v^2(u_i + \Delta u) - v^2(u_i)}{2\|\vec{C}(u_i + \Delta u) - \vec{C}(u_i)\|};$$

wherein $u_i$ is the parameter value of the current interpolation point, the numerator represents the velocity value, and the denominator represents using a chord segment between two of the interpolation points on the NURBS curve to replace an arc segment.

In one embodiment, the velocity value of the intermediate point is calculated using the following formulas:

$$V_{mid} = V_m + a_m(u_{mid} - u_m);$$ second formula:

$$V_{mid} = V_{m+n} + a_{m+n}(u_{mid} - u_{m+n});$$ third formula:

wherein $a_m$ and $a_{m+n}$ are respectively the acceleration of two end points of the acceleration sensitive interval of the velocity curve, and $u_m$ and $u_{m+n}$ are respectively the corresponding parameters of the two end points; the value of $v_{mid}$ is the minimum value among a value calculated through the second and the third formulas and the maximum allowable velocity.

In one embodiment, the velocity value of the intermediate point is set as the maximum allowable velocity when the velocity value of the intermediate point is greater than the maximum allowable velocity.

In one embodiment, the acceleration of the start point is a slope value of the start point of the acceleration sensitive interval, an initial acceleration from the intermediate point to decelerate to another end point is 0, and an end acceleration is a slope value of an end point of the acceleration sensitive interval.

In order to solve the above problem, the present disclosure still further provides a velocity control device based on NURBS curve interpolation, including: a maximum allowable velocity curve confirm unit configured to determine a curve of a maximum allowable velocity based on a curvature $1\rho_i$ of everywhere of the NURBS curve, a constraint condition of a chord height error $\delta_{max}$ and a constraint condition of a centripetal acceleration $a_{max}$; an acceleration sensitive point confirm unit configured to calculate an acceleration $a_i$ within each parameter step length $\Delta u_i$ and determine an end point of the parameter step length $\Delta u_i$ corresponding to the acceleration $a_i$ with a minimum difference from a maximum allowable acceleration as the acceleration sensitive point when the acceleration $a_i$ within the parameter step length $\Delta u_i$ is greater than the maximum allowable acceleration and the acceleration $a_{i+n}$ within the parameter step length $\Delta u_{i+n}$ is smaller than the maximum allowable acceleration; an intermediate point velocity confirm unit configured to determine a corresponding parameter value $u_{mid}$ according to an intermediate point of an acceleration sensitive interval of each velocity curve segment obtained by dividing the curve of the maximum allowable velocity at a minimum value, and calculating a velocity value of the intermediate point; and an interpolation point calculating unit configured to determine whether a parameter u corresponding to an interpolation point has entered the acceleration sensitive interval, and accelerating from a side point of the acceleration sensitive interval taken as a start point to the intermediate point, and decelerating from the intermediate point to another side point of the acceleration sensitive interval taken as an end point when the parameter u corresponded by the interpolation point is determined to have entered the acceleration sensitive interval, wherein an acceleration of the intermediate point is 0.

In one embodiment, the intermediate point velocity confirms unit determines the velocity value of the intermediate point as the maximum allowable velocity when the velocity value of the intermediate point is greater than the maximum allowable velocity.

In one embodiment, the acceleration sensitive point confirm unit is configured to calculate the acceleration $a_i$ within the parameter step length $\Delta u_i$ through the following formula:

first formula:

$$a_i = \frac{v_{i+1}^2 - v_i^2}{2s_i} \approx \frac{v^2(u_i + \Delta u) - v^2(u_i)}{2\|\vec{C}(u_i + \Delta u) - \vec{C}(u_i)\|};$$

wherein $u_i$ is the parameter value of the current interpolation point, the numerator represents the velocity value, and the denominator represents using a chord segment between two of the interpolation points on the NURBS curve to replace an arc segment.

In one embodiment, the velocity value of the intermediate point is calculated using the following formulas:

$$V_{mid}=V_m+a_m(u_{mid}-u_m);$$ second formula:

$$V_{mid}=U_{m+n}+a_m+n(u_{mid}-u_{m+n});$$ third formula:

wherein $a_m$ and $a_{m+n}$ are respectively the acceleration $a_i$ of two end points of the acceleration sensitive interval of the velocity curve, and $u_m$ and $u_{m+n}$ are respectively the corresponding parameters of the two end points; the value of $v_{mid}$ is the minimum value among a value calculated through the second and the third formulas and the maximum allowable velocity.

In one embodiment, the acceleration $a_i$ of the start point is a slope value of the start point of the acceleration sensitive interval, an initial acceleration from the intermediate point to decelerate to another end point is 0, and an end acceleration is a slope value of an end point of the acceleration sensitive interval.

In order to solve the above problem, the present disclosure still further provides a numerical control machine, including a numerical control system, a servo motor, and an execution component, the numerical control system is configured to: obtain numerical control machining route data with a NURBS curve; obtain an acceleration $a_i$ within a parameter step length $\Delta u_i$ on the NURBS curve; compare the acceleration $a_i$ of everywhere of the NURBS curve with a maximum allowable acceleration to determine an acceleration sensitive point and determine an acceleration sensitive interval basing on the determined acceleration sensitive point; determine an intermediate point of the acceleration sensitive interval as a demarcation point of the acceleration and the deceleration within the sensitive interval; calculate a velocity value of the intermediate point as a target velocity; plan acceleration and deceleration of the acceleration sensitive interval basing on the target velocity to obtain the numerical control machining route data with the planned NURBS curve; and receive the numerical control machining route data with the planned NURBS curve and control the execution component to perform numerical control machining according to the received numerical control machining route data through the servo motor.

In one embodiment, the method for comparing the acceleration $a_i$ of everywhere of the NURBS curve with the maximum allowable acceleration to determine the acceleration sensitive point and determining the acceleration sensitive interval based on the determined acceleration sensitive point includes: calculating a curvature $1/\rho_i$ of everywhere of the NURBS curve and determining a maximum allowable velocity curve based on a constraint condition of a chord height error $\delta_{max}$ and a constraint condition of a centripetal acceleration $a_{max}$; and calculating the acceleration $a_i$ within the parameter step length $\Delta u$ determining an end point of the parameter step length $\Delta u_i$ corresponding to the acceleration $a_i$ with a minimum difference from the maximum allowable acceleration as the acceleration sensitive point when the acceleration $a_i$ within the parameter step length $\Delta u_i$ is greater than the maximum allowable acceleration and the acceleration $a_{i+n}$ within the parameter step length $\Delta u_{i+n}$ is smaller than the maximum allowable acceleration, and determining the acceleration sensitive interval based on the determined acceleration sensitive point.

In one embodiment, the method for calculating the velocity value of the intermediate point includes: dividing the curve of the maximum allowable velocity into a plurality of segments at a minimum value, determining a corresponding parameter value $u_{mid}$ according to an intermediate point of an acceleration sensitive interval of each velocity curve segments, and calculating a velocity value of the intermediate point.

In one embodiment, the acceleration $a_i$ within each parameter step length $\Delta u_i$ is calculated through the following formula:

first formula:

$$a_i = \frac{v_{i+1}^2 - v_i^2}{2s_i} \approx \frac{v^2(u_i+\Delta u) - v^2(u_i)}{2\|\vec{C}(u_i+\Delta u) - \vec{C}(u_i)\|};$$

wherein $u_i$ is the parameter value of a current interpolation point, the numerator represents the velocity value, and the denominator represents using a chord segment between two of the interpolation points on the NURBS curve to replace an arc segment; and the velocity value of the intermediate point is calculated using the following formulas:

$$V_{mid}=V_m+a_m(u_{mid}-u_m);$$ second formula:

$$V_{mid}=V_{m+n}+a_m+n(u_{mid}-u_{m+n});$$ third formula:

wherein $a_m$ and $a_{m+n}$ are respectively the acceleration of two end points of the acceleration sensitive interval of the velocity curve, and $u_m$ and $u_{m+n}$ are respectively the corresponding parameters of the two end points; the value of $v_{mid}$ is the minimum value among a value calculated through the second and the third formulas and the maximum allowable velocity.

In one embodiment, the planning the acceleration and deceleration of the acceleration sensitive interval based on the target velocity to obtain the planned numerical control machining route data with the NURBS curve includes: determining whether one or more parameters corresponding to an interpolation point has entered the acceleration sensitive interval; and accelerating from a side point of the acceleration sensitive interval taken as a start point to the intermediate point, and decelerating from the intermediate point to another side point of the acceleration sensitive interval taken as an end point when the one or more parameters corresponded by the interpolation point are determined to have entered the acceleration sensitive interval.

The present disclosure provides a method and device for planning curve velocity based on NURBS curve interpolation as well as a numerical control machining route data processing method using NURBS curve interpolation velocity planning, which redo S type velocity planning by predicting the acceleration sensitive points using a maximum acceleration allowed by the system in the acceleration sensitive interval. As a result, NURBS interpolation can be accelerated and decelerated in strict accordance with the new velocity curve while there is no necessary to worry about the velocity and the acceleration to beyond limitations. In addition, since the new velocity curve deviates from the original maximum allowable velocity curve only at the acceleration sensitive point, the machining efficiency is maximized under the constraints of the velocity and the acceleration. At the same time, the algorithm can interpolate at one time without backtracking and without necessary to wait for the interpolation results of any side, hence the computation is light and the real-time performance of interpolation is guaranteed.

DETAILED DESCRIPTION

Figure 1A:
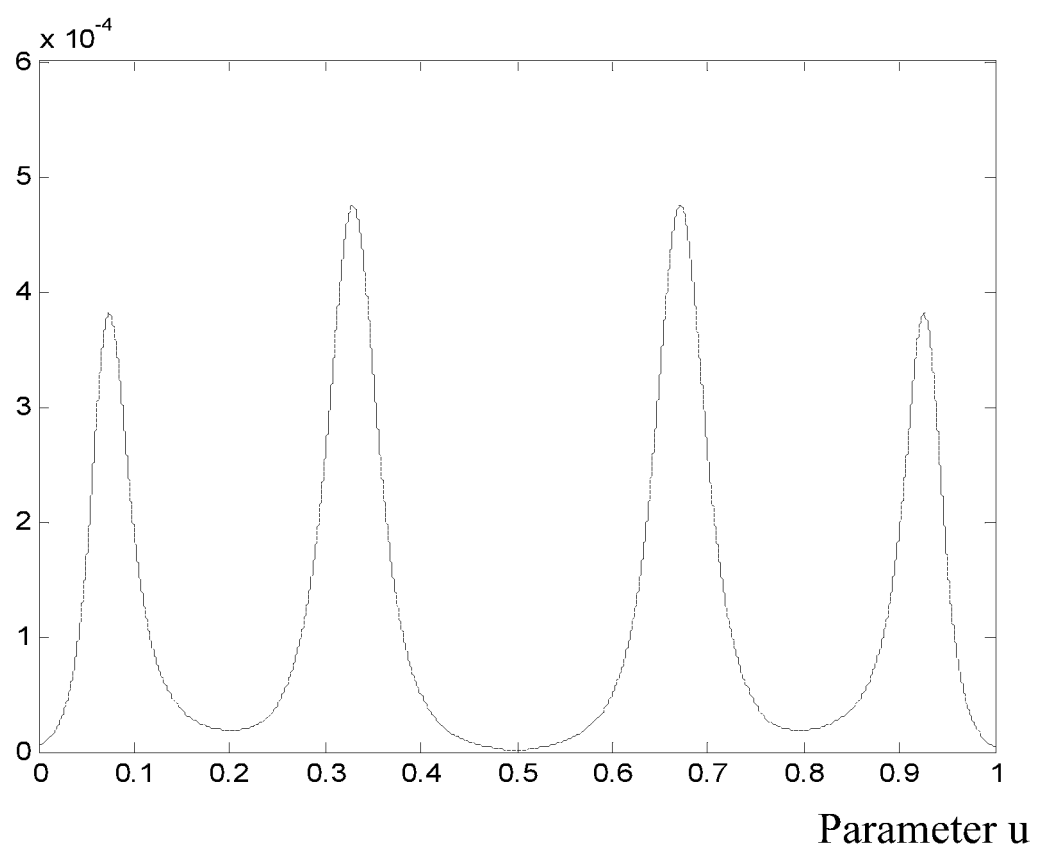
FIGS. 1a and 1b are schematic diagrams of the functional relationship among a parameter u, a NURBS curve curvature and a maximum allowable velocity in the prior art.

In order to give a detailed description of the technical content, structural features, purpose and effect of the present disclosure, the present disclosure is described in detail in conjunction with the drawings and embodiments.

Firstly, the basic principles of a NURBS curve interpolation algorithm are described as follows.

1. NURBS curve is a piecewise polynomial curve, usually written as a form of one variable function with respect to an argument u:

$$\vec{C} = \frac{\sum_{i=0}^{n} N_{i,n}(u) w_i \vec{P}_i}{\sum_{i=0}^{n} N_{i,n}(u) w_i} \tag{1}$$

where, p is the order (the highest power of the polynomial), Pi is the control point (the Cartesian coordinates of the polygon which limits the shape of the curve), $w_i$ is the weight (the extent to which the curve is attracted by the control point), $u_i$ is the node (the parameter value of the start and end point in the segmented interval), and u is the independent variable of the NURBS curve called the node vector, where $U = \{U_1, U_2, \ldots, U_{n+1}\}$. $N_{i,p}(u)$ is a non-uniform rational B-spline basis function, which is determined by the node vector U and satisfies Cox-de Boor recursive relation expressions (2) and (3):

$$N_{i,p}(u) = \frac{u - u_i}{u_{i+p} - u_i} N_{i,p-1}(u) + \frac{u_{i+p+1} - u}{u_{i+p+1} - u_{i+1}} N_{i+1,p-1}(u) \tag{2}$$

$$N_{i,0}(u) = \begin{cases} 1, & u \in [u_i, u_{i+1}) \\ 0, & \text{others} \end{cases} \tag{3}$$

2. The velocity control of NURBS curve interpolation:
the NURBS curve is set as: P(u)=(x(u), y(u), z(u))
wherein, the time function u is the curve parameter, which is denoted by $u(t_i)=u_i$, $u(t_{i+1})=u_{i+1}$. Each parameter u corresponds to a point on the NURBS curve. Hence, the NURBS curve interpolation is to select a series of u in the parameter field and calculate the points on the curve corresponded by the u (i.e., the machining section in the machining path of the machining tool).

The parameter value of the current point is $u(t_i)$, hence the corresponding parameter $u(t_{i+1})$ of the interpolation point which after an interpolation cycle T satisfies the following Taylor expansion:

$$u(t_{i+1}) = u(t_i) + T \frac{du}{dt}\bigg|_{t=t_i} + T^2 \frac{d^2 u}{dt^2}\bigg|_{t=t_i} + o(T^2) \tag{4}$$

3. the impact of chord height error on the feed rate and feed step length:
the NURBS curve interpolation is usually realized by using a chord segment between two interpolation points $u_i$ and $u_{i+1}$ to close an arc segment, and the maximum distance between the chord segment and the arc segment is a maximum interpolation string high error. In a fixed periodic numerical control interpolation, in order to ensure that the interpolation trajectory to satisfy a certain accuracy requirement, it is necessary to limit the maximum feed rate.

The arc approximation method can be used to obtain the chord height error:

$$\delta_i = \rho_i - \sqrt{\rho_i^2 - \left(\frac{V(u_i)T}{2}\right)^2} \tag{5}$$

where, $\rho_i$ is the radius of curvature at $u_i$, V is the programmed feed rate, and T is the interpolation period. Through formula (5), it can be obtained that:

$$V(u_i) = \frac{2}{T} \sqrt{\rho_i^2 - (\rho_i - \delta_i)^2} \approx \frac{\sqrt{8\rho_i \delta_i}}{T} \tag{6}$$

Assuming that the maximum chord height error is $\delta_{max}$, then it can be obtained through formula (6) that:

$$V(u_i) \leq \frac{\sqrt{8\rho_i \delta_{max}}}{T} \Delta L_i \leq \sqrt{8\rho_i \delta_{max}} \tag{7}$$

where, $\Delta L_i$ is the feeding step length of the i-th segment. From the above equation, it can be seen that each segment of the feeding step length must meet the limit condition of the maximum chord height error. At the same time, in order to satisfy the requirements of the machining accuracy of a numerical control machine, the feeding step length of the NURBS curve in each interpolation period must also consider the constraints of the acceleration and deceleration as well as the maximum normal acceleration, that is:

$$\Delta L = \min(\Delta L_{i1}, \sqrt{8\rho_i \delta_{max}}, \Delta T \sqrt{\rho a_{max}}) \tag{8}$$

where, $\Delta L_{i1}$ is the feeding step length under the constraint of acceleration and deceleration, $a_{max}$ is the maximum normal acceleration, and:

$$a_{max} = V(u_i)^2 \rho_i \tag{9}$$

Figure 1B:
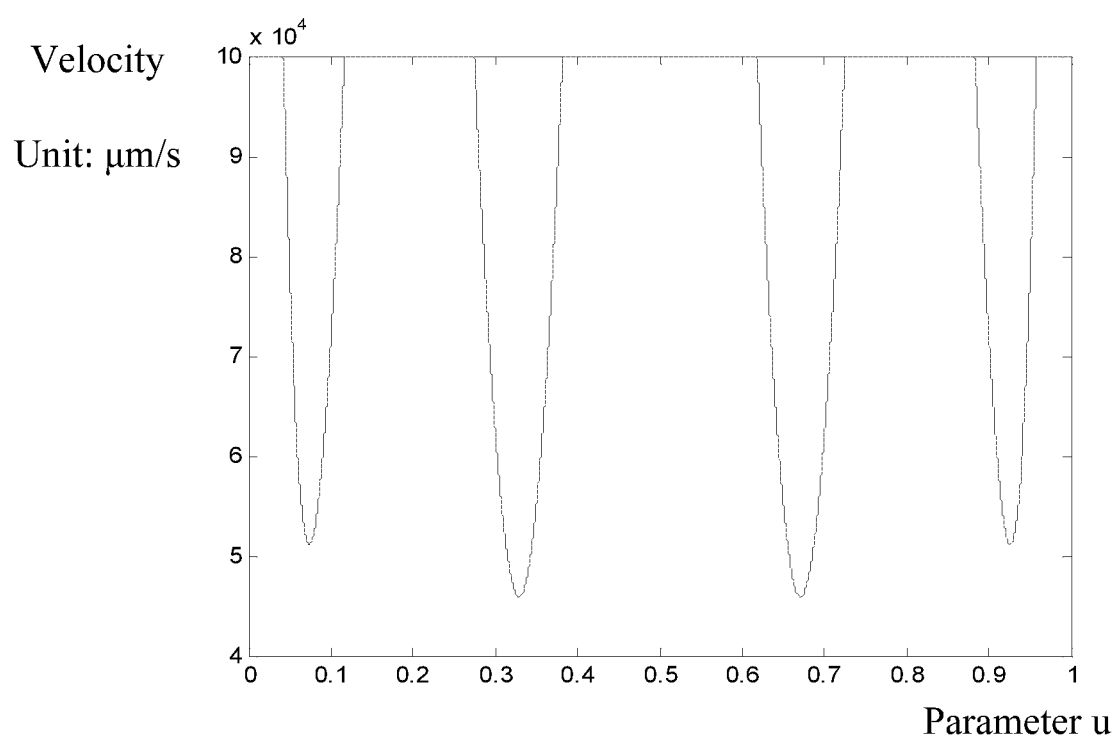

Therefore, according to the above formula and as shown in FIGS. 1a and 1b, through calculating the curvature of the curve of the interpolation point, the maximum velocity allowed at the interpolation point can be obtained. The end velocity accelerating from the current interpolation point to the next interpolation point cannot exceed the allowable maximum velocity.

Figure 2:
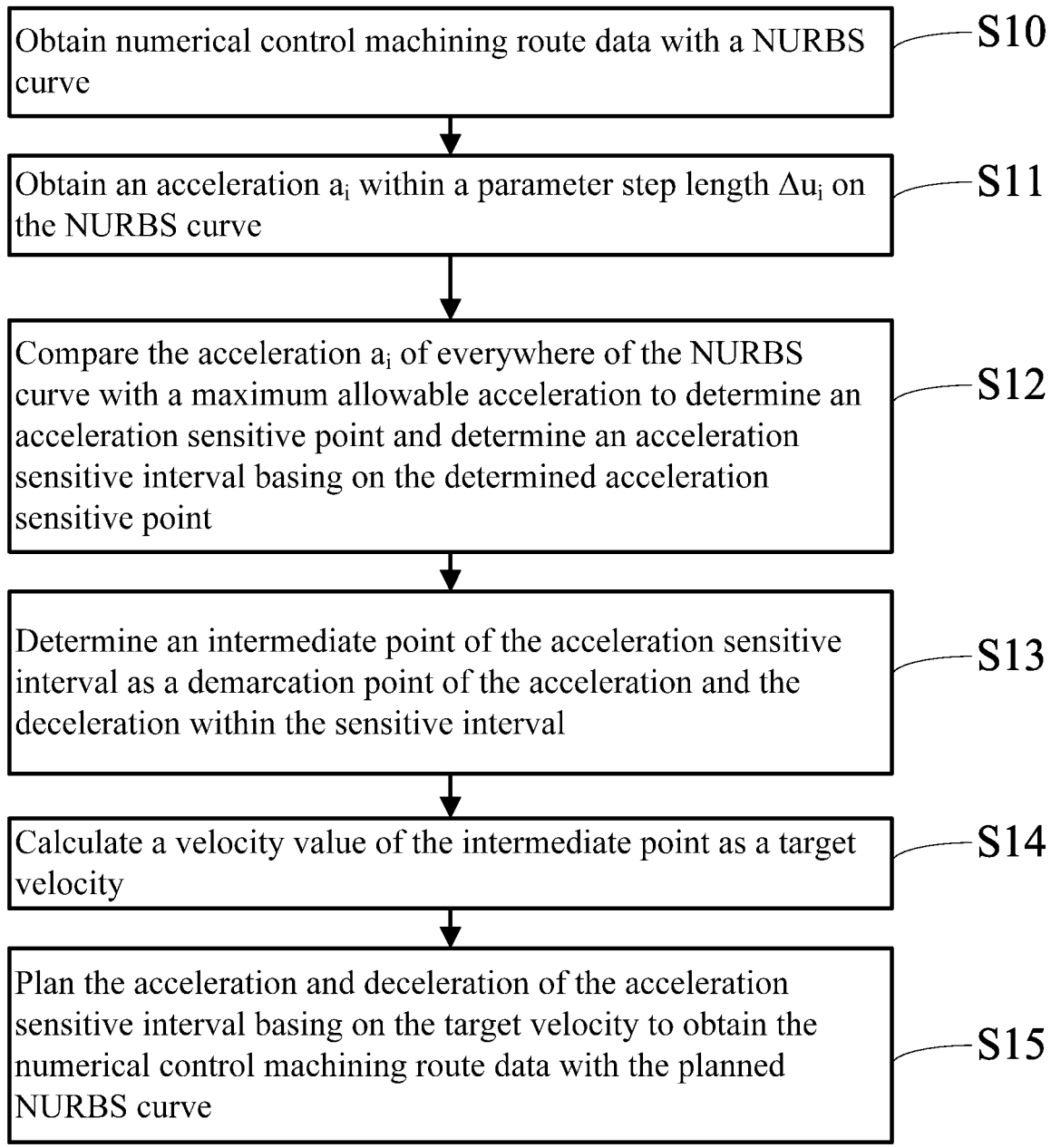
FIG. 2 is a flow chart of a numerical control machining route data processing method according to an embodiment of the present disclosure.

Referring to FIG. 2, a flow chart of a numerical control machining route data processing method according to an embodiment of the present disclosure is depicted. The method may include the following blocks.

At S10: obtaining numerical control machining route data with a NURBS curve.

At S11: obtaining an acceleration $a_i$ within a parameter step length $\Delta u_i$ on the NURBS curve.

At S12: comparing the acceleration of everywhere of the NURBS curve with a maximum allowable acceleration to determine an acceleration sensitive point and determining an acceleration sensitive interval based on the determined acceleration sensitive point.

In this embodiment, a maximum allowable acceleration is determined based on a curvature $1/\rho_i$ of everywhere of the NURBS curve, a constraint condition of a chord height error $\delta_{max}$, and a constraint condition of a centripetal acceleration $a_{max}$. When the acceleration $a_i$ within the parameter step length $\Delta u_i$ is greater than the maximum allowable acceleration and the acceleration $a_{i+n}$ within the parameter step length $\Delta u_{i+n}$ is smaller than the maximum allowable acceleration, an end point of the parameter step length corresponding to the acceleration with a minimum difference from the maximum allowable acceleration is determined as the acceleration sensitive point.

At S13: determining an intermediate point of the acceleration sensitive interval as a demarcation point of the acceleration and the deceleration within the sensitive interval.

At S14: calculating a velocity value of the intermediate point as a target velocity.

At S15: planning the acceleration and deceleration of the acceleration sensitive interval based on the target velocity to obtain the numerical control machining route data with the planned NURBS curve.

In one embodiment, when the parameter(s) corresponded by the interpolation point have entered the acceleration sensitive interval, it accelerates from a side point of the acceleration sensitive interval which is taken as a start point to the intermediate point, and decelerates from the intermediate point to another side point of the acceleration sensitive interval which is taken as an end point, thereby realizing planning the acceleration and deceleration of the acceleration sensitive interval.

Figure 3:
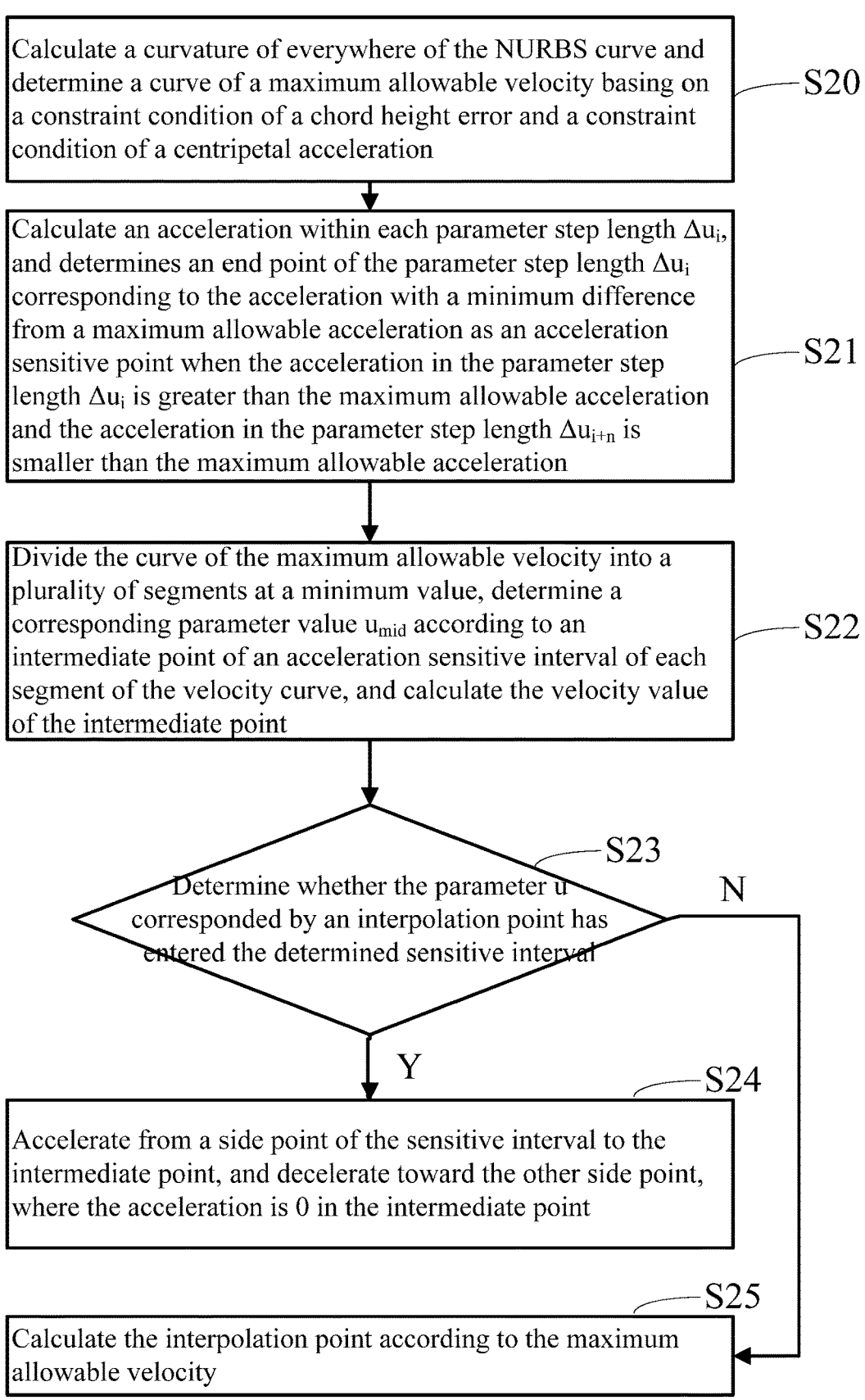
FIG. 3 is a flow chart of a velocity control method based on NURBS curve interpolation according to another embodiment of the present disclosure.

Referring to FIG. 3, a flow chart of a velocity control method based on NURBS curve interpolation according to another embodiment of the present disclosure is depicted. The method may include the following blocks.

At S20: calculating a curvature $1/\rho_i$ of everywhere of the NURBS curve and determining a curve of a maximum allowable velocity (i.e., the maximum allowable velocity $V_{max}$ of everywhere of the NURBS curve) based on a constraint condition of a chord height error $\delta_{max}$ (formula (5)) and a constraint condition of a centripetal acceleration $a_{max}$ (formula (9)).

At S21: calculating an acceleration within each parameter step length $\Delta u_i$ and comparing with a maximum allowable acceleration. When the acceleration $a_i$ within the parameter step length $\Delta u_i$ is greater than the maximum allowable acceleration and the acceleration $a_{i+n}$ within the parameter step length $\Delta u_{i+n}$ is smaller than the maximum allowable acceleration, it determines an end point of the parameter step length corresponding to the acceleration with a minimum difference from a maximum allowable acceleration as the acceleration sensitive point.

Where, the value of the parameter step length $\Delta u$ is set as a minimum value such as $\Delta u=10^{-5}$, hence the acceleration process within the parameter step length $\Delta u$ can be regarded as an even acceleration process.

Specifically, the acceleration in each parameter step length $\Delta u_i$ is calculated using the following equation (10)

$$a_i = \frac{v_{i+1}^2 - v_i^2}{2s_i} \approx \frac{v^2(u_i + \Delta u) - v^2(u_i)}{2\|\vec{C}(u_i + \Delta u) - \vec{C}(u_i)\|} \quad (10)$$

Where, $u_i$ is the parameter value of the current interpolation point, the numerator represents the velocity value, and the denominator represents using a chord segment between two of the interpolation points on the NURBS curve to replace an arc segment. Since the length of the chord segment is smaller than that of the arc segment, the calculated value of the acceleration is larger than the real value. If the larger acceleration value is to be restricted to smaller than the maximum allowable acceleration, the real value of the acceleration at all positions will certainly not exceed the limitation of the maximum allowable acceleration.

Figure 4:
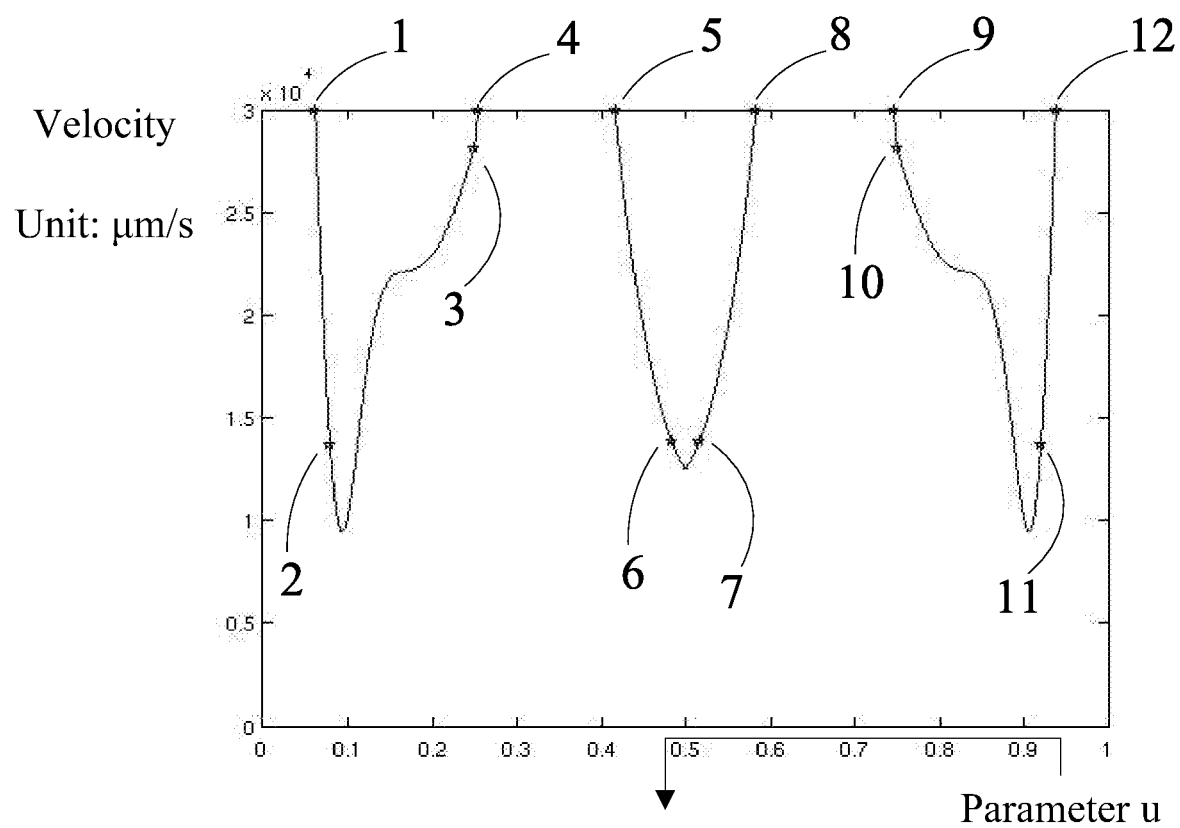
FIG. 4 is a schematic diagram of determining an acceleration sensitive point in accordance with a parameter u and a maximum allowable velocity according to an embodiment of the present disclosure.

Furthermore, through comparing the acceleration value of the end point of each parameter step length $\Delta u_i$ and the maximum allowable acceleration value, the acceleration sensitive point such as star mark point as shown in FIG. 4 can be obtained.

At S22: dividing the curve of the maximum allowable velocity determined in step S20 into a plurality of segments at a minimum value (each segment of the curve of the maximum allowable velocity is hereinafter referred to as a velocity curve segment), that is, the velocity curve between two velocity wave troughs is a segment (the start point and the end point of a complete curve are also considered as a velocity wave trough). The acceleration sensitive point of a velocity curve segment is determined, the corresponding acceleration sensitive interval (hereinafter referred to as the sensitive interval) and a parameter value $u_{mid}$ corresponded by the intermediate point of the sensitive interval are determined, and the velocity value of the intermediate point is calculated.

Specifically, two end points of the sensitive interval are respectively extended with a line and intersected at a point according to the current slope, and the intersected point is called an intermediate point, and the parameter value $u_{mid}$ corresponded by the intermediate point is the end point of the acceleration interpolation phase of the velocity curve segment, and is simultaneously the start point of the deceleration interpolation phase. When the intermediate point velocity is greater than the maximum allowable velocity, then the maximum allowable velocity is used.

Where, the velocity value of the intermediate point is calculated using the following formulas (11) and (12):

$$V_{mid} = V_m + a_m(u_{mid} - u_m) \quad (11)$$

$$V_{mid} V_{m+n} + a_{m+n}(u_{mid} - u_{m+n}) \quad (12)$$

Where, $a_m$ and $a_{m+n}$ are respectively the accelerations of two end points of the acceleration sensitive interval of the velocity curve segment, and $u_m$ and $u_{m+n}$ are respectively the corresponding parameters of the two end points.

As shown in FIG. 4, where the interval included in points 1 to 2, points 3 to 4, points 5 to 6, points 7 to 8, points 9 to 10, points 11 to 12 are the sensitive interval. Here the sensitive intervals between points 3 to 4 and points 5 to 6 are used as examples for illustration.

Through calculating the accelerations $a_3$, $a_6$ of the points 3 and 6 to take as the slope, straight line equations $l_1$ and $l_2$ which pass through 3 points (u3, v3) and 6 points (u6, v6) can be obtained, respectively:

$$l_1: v = v_3 + a_3(u - u_3)$$

$$l_2: v = v_6 + a_6(u - u_6)$$

The coordinates ($u_{mid}$, $v_{mid}$) of the intersection (i.e., the midpoint) can be obtained by taking the above equations as simultaneous equations. Where, the value of $v_{mid}$ is the minimum value between the calculated value and the maximum allowable velocity. It should be noted that, since the slope $a_3$ and $a_6$ are the maximum allowable acceleration in the acceleration and the deceleration phase, as long as the re-planned velocity curve is below the two lines, it should satisfy the limitation of the system acceleration. The intermediate point obtained through this way will be enclosed below the two straight lines. That is, it can ensure that the end point and the start point of the acceleration and the deceleration are within the scope satisfying the limitation of the acceleration, therefore the coordinate of the middle point is reasonable and acceptable.

At S23: initiating a real-time interpolation, determining the parameter u corresponded to the interpolation point according to the formula (4) and determining whether the parameter u has entered the determined sensitive interval. If so, enter step S24; otherwise, enter step S25.

At S24: accelerating from a side (e.g., the left side) point of the sensitive interval to the intermediate point, and decelerating toward the other side (e.g., the right side) point of the sensitive interval, where the acceleration is 0 in the intermediate point. Then, the process ends.

Where, the acceleration of the start point is the slope value of the point, the acceleration and the jerk should be maintained as the requirement of equation (8), and the initial acceleration is 0, and the end acceleration is the slope value of the side point of the other side (the right side).

Specifically, the acceleration from the left side of the sensitive interval to the intermediate point is an S-like type acceleration process. The initial acceleration is not 0 and the end acceleration is 0. The end velocity should not exceed $v_{mid}$ and the end point of the acceleration should not exceed $u_{mid}$. It is used as the acceleration condition, each cycle in the acceleration process is utilized as a basis for whether or not to use positive jerk, and ultimately to accelerate to the intermediate point softly. The process of decelerating from the intermediate point is also an S-like type deceleration process, where the initial acceleration is 0, the end acceleration is not 0, the end velocity as close as possible to $v_6$, and the end point of the acceleration should not exceed $u_6$.

Since the user has specified the feed rate limitation such that the curve of the maximum allowable velocity emerges an even velocity segment (for example, the interval of point 4 to point 5 in FIG. 4), it is possible that the acceleration from the end point of the sensitive interval to the even velocity segment terminates in a very short period of time, the efficiency loss due to the acceleration limitation is minimized.

Figure 5:
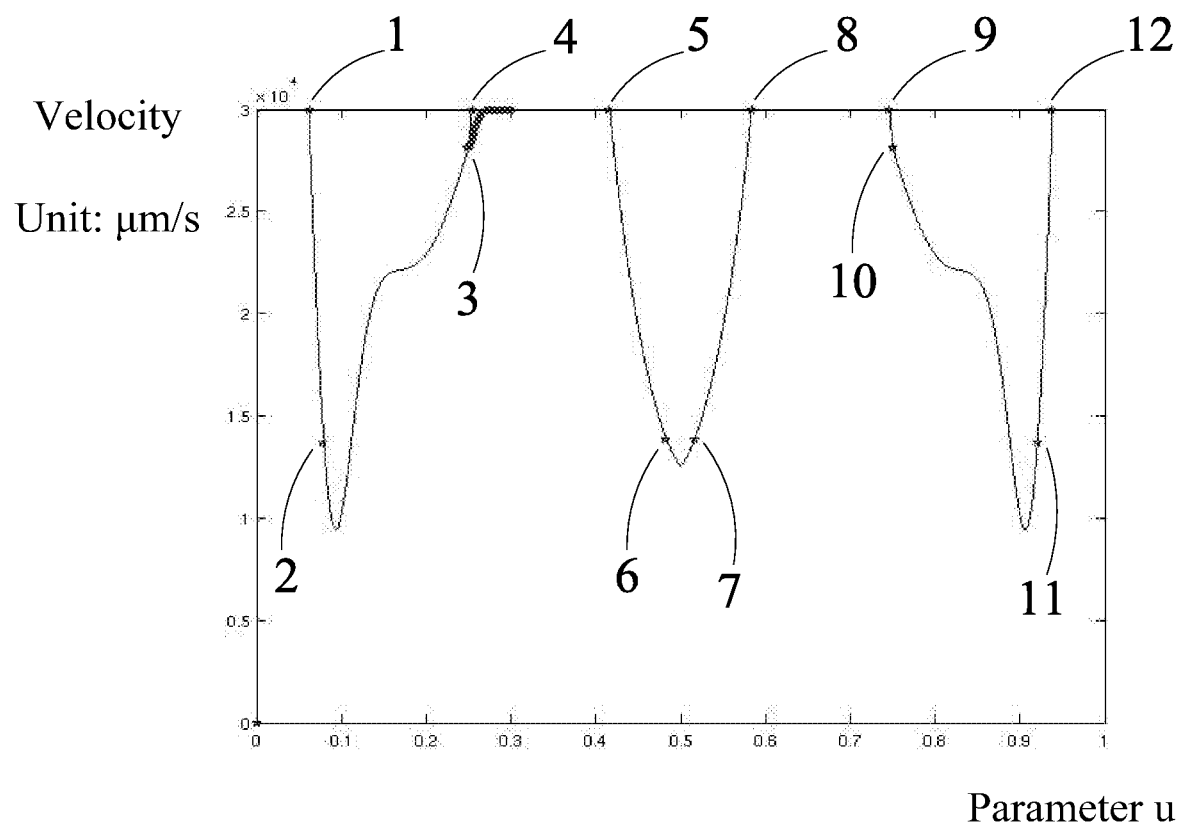
FIG. 5 is a schematic diagram of velocity planning according to an embodiment of the present disclosure.

As shown in FIG. 5, the deep color segment is the velocity plan redid from the end point of the sensitive interval to the intermediate point. This means that the acceleration from the trough of the adjacent velocity at the left side of the deep color segment along the non-deep color segment and the deep color segment is both satisfies the velocity limitation and the acceleration limitation.

At S25: calculating the interpolation point based on the maximum allowable velocity according to the formula (8), and then the process ends.

Figure 6:
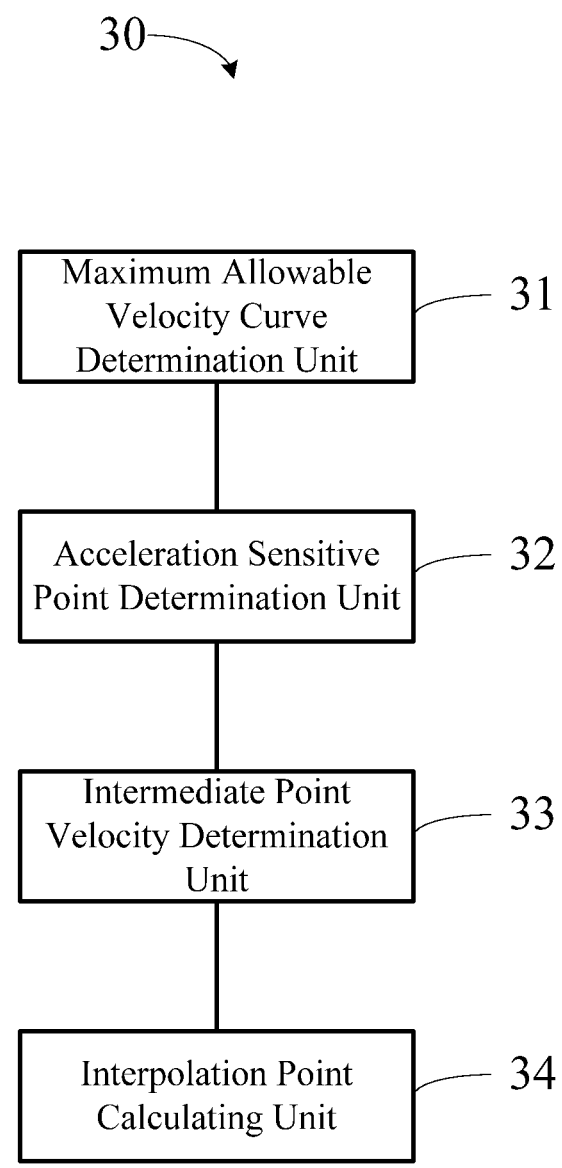
FIG. 6 is a schematic diagram of the function modules of a velocity control device based on NURBS curve interpolation according to an embodiment of the present disclosure.

Referring to FIG. 6, a schematic diagram of the function modules of a velocity control device based on NURBS curve interpolation according to an embodiment of the present disclosure is depicted. The device 30 includes:

a maximum allowable velocity curve confirm unit 31 configured to determine a curve of a maximum allowable velocity based on a curvature $1/\rho_i$ of everywhere of the NURBS curve, a constraint condition of a chord height error $\delta_{max}$ and a constraint condition of a centripetal acceleration $a_{max}$;

an acceleration sensitive point confirm unit 32 configured to calculate an acceleration within each parameter step length $\Delta u_i$ and determine an end point of the parameter step length corresponding to the acceleration with a minimum difference from a maximum allowable acceleration as the acceleration sensitive point when the acceleration $a_i$ within the parameter step length $\Delta u_i$ is greater than the maximum allowable acceleration and the acceleration $a_{i+n}$ within the parameter step length $\Delta u_{i+n}$ is smaller than the maximum allowable acceleration;

an intermediate point velocity confirm unit 33 configured to determine a corresponding parameter value $u_{mid}$ according to an intermediate point of an acceleration sensitive interval of each velocity curve segment obtained by dividing the curve of the maximum allowable velocity at a minimum value, and calculate a velocity value of the intermediate point; and an interpolation point calculating unit 34 configured to determine whether a parameter u corresponding to an interpolation point has entered the acceleration sensitive interval, and accelerate from a side point of the acceleration sensitive interval taken as a start point to the intermediate point and decelerate from the intermediate point to another side point of the acceleration sensitive interval taken as an end point when the parameter u corresponded by the interpolation point is determined to have entered the acceleration sensitive interval, wherein an acceleration of the intermediate point is 0.

Figure 7:
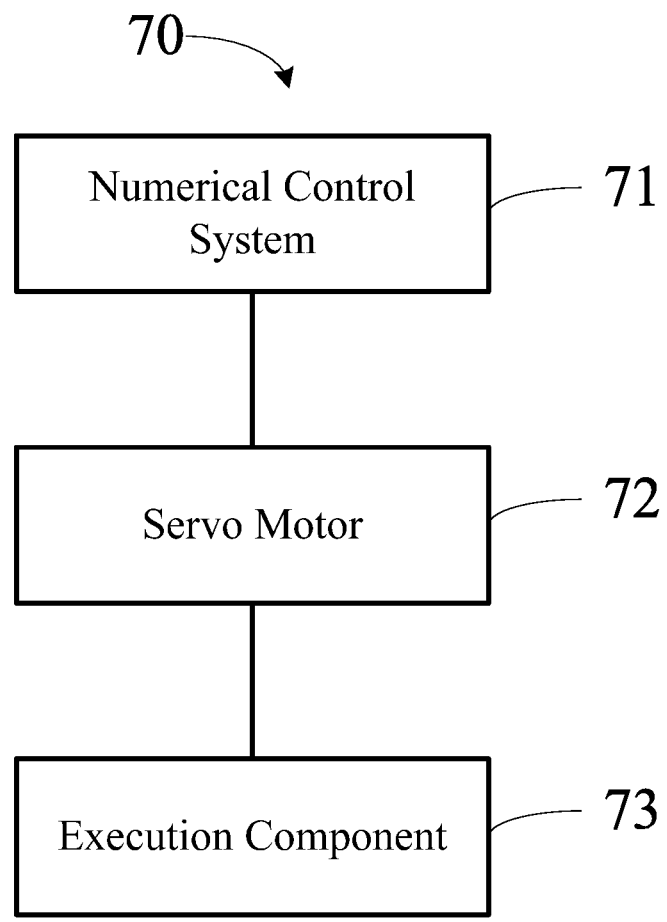
FIG. 7 is a schematic diagram of the structure of a numerical control machine according to an embodiment of the present disclosure.

Referring to FIG. 7, a schematic diagram of the structure of a numerical control machine according to an embodiment of the present disclosure is depicted. The numerical control machine 70 includes a numerical control system 71, a servo motor 72, and an execution component 73.

The numerical control system 71 is configured to obtain numerical control machining route data with a NURBS curve; obtain an acceleration $a_i$ within a parameter step length $\Delta u_i$ on the NURBS curve; compare the acceleration $a_i$ of everywhere of the NURBS curve with a maximum allowable acceleration to determine an acceleration sensitive point and determine an acceleration sensitive interval based on the determined acceleration sensitive point; determine an intermediate point of the acceleration sensitive interval as a demarcation point of the acceleration and the deceleration within the sensitive interval; calculate a velocity value of the intermediate point as a target velocity; and plan the acceleration and the deceleration of the acceleration sensitive interval based on the target velocity to obtain the numerical control machining route data with the planned NURBS curve and transmit the numerical control machining route data with the planned NURBS curve to the servo motor 72.

In particular, the numerical control system 71 may plan the numerical control machining route data using the embodiment of FIGS. 1a, 1b and its corresponding method. In addition, the numerical control system 71 specifically determines the acceleration, the acceleration sensitive point, the velocity of the intermediate point in each parameter step length $\Delta u_i$. The planning of the acceleration and the deceleration of the acceleration sensitive interval according to the target velocity can be referred to FIG. 2 and its corresponding method. That is, the numerical control system 71 can perform the velocity control based on NURBS curve interpolation in the embodiment shown in the above-mentioned FIG. 2, thereby realizing the above-mentioned planning of the numerical control machining route data.

The servo motor 72 receives the numerical control machining route data with the planned NURBS curve, and controls the execution component 73 to perform numerical control machining according to the received numerical control machining route data, such that the execution component 73 performs the machining according to the planned numerical control machining route. Where, the execution component 73 can be an industrial robot, a machining tool, and the like for machining.

The present disclosure provides a method and device for planning curve velocity based on NURBS curve interpolation as well as a numerical control machining route data processing method using NURBS curve interpolation velocity planning, which redo S type velocity planning by predicting the acceleration sensitive points using a maximum acceleration allowed by the system in the acceleration sensitive interval. As a result, NURBS interpolation can be accelerated and decelerated in strict accordance with the new velocity curve while there is no necessary to worry about the velocity and the acceleration to beyond limits. In addition, since the new velocity curve deviates from the original maximum allowable velocity curve only at the acceleration sensitive point, the machining efficiency is maximized under the constraints of the velocity and the acceleration. At the same time, the algorithm can interpolate at one time without backtracking and without necessary to wait for the interpolation results of any side, hence the computation is light and the real-time performance of interpolation is guaranteed.

The foregoing is merely an embodiment of the present disclosure, which is not for limiting the scope of the present disclosure. Any equivalent structure or process transformation based on the specification and the drawings of the present disclosure, or direct or indirect applications in other related arts, are all included in the protection scope of the present disclosure.

What is claimed is:

1. A numerical control machining route data processing method, comprising:
   obtaining numerical control machining route data with a NURBS (non-uniform rational B-splines) curve;
   obtaining an acceleration within a parameter step length on the NURBS curve;
   comparing the acceleration of everywhere of the NURBS curve with a maximum allowable acceleration to determine an acceleration sensitive point and determining an acceleration sensitive interval based on the determined acceleration sensitive point;
   determining an intermediate point of the acceleration sensitive interval as a demarcation point of the acceleration and the deceleration within the sensitive interval;
   calculating a velocity value of the intermediate point as a target velocity; and
   planning the acceleration and deceleration of the acceleration sensitive interval based on the target velocity to obtain the numerical control machining route data with the planned NURBS curve;
   wherein the comparing the acceleration of everywhere of the NURBS curve with the maximum allowable acceleration to determine the acceleration sensitive point and determining the acceleration sensitive interval based on the determined acceleration sensitive point comprises:
   calculating a curvature $1/\rho_i$ of everywhere of the NURBS curve and determining a maximum allowable velocity curve based on a constraint condition of a chord height error $\delta_{max}$ and a constraint condition of a centripetal acceleration $a_{max}$; and
   calculating the acceleration $a_i$ within each parameter step length $\Delta u_i$, determining an end point of the parameter step length corresponding to the acceleration with a minimum difference from the maximum allowable acceleration as the acceleration sensitive point when the acceleration $a_i$ within the parameter step length $\Delta u_i$ is greater than the maximum allowable acceleration and the acceleration $a_{i+n}$ within the parameter step length $\Delta u_{i+n}$ is smaller than the maximum allowable acceleration, and determining the acceleration sensitive interval based on the determined acceleration sensitive point.

2. The method of claim 1, wherein the planning the acceleration and deceleration of the acceleration sensitive interval based on the target velocity to obtain the numerical control machining route data with the planned NURBS curve comprises:
   determining whether one or more parameters corresponding to an interpolation point has entered the acceleration sensitive interval; and
   accelerating from a side point of the acceleration sensitive interval taken as a start point to the intermediate point, and decelerating from the intermediate point to another side point of the acceleration sensitive interval taken as an end point when the one or more parameters corresponded by the interpolation point are determined to have entered the acceleration sensitive interval.

3. A velocity control method based on NURBS (non-uniform rational B-splines) curve interpolation, comprising:
   calculating a curvature $1/\rho_i$ of everywhere of the NURBS curve and determining a curve of a maximum allowable velocity based on a constraint condition of a chord height error $\delta_{max}$ and a constraint condition of a centripetal acceleration $a_{max}$;
   calculating an acceleration $a_i$ within each parameter step length $\Delta u_i$ and determining an end point of the parameter step length $\Delta u_i$ corresponding to the acceleration $a_i$ with a minimum difference from a maximum allowable acceleration as the acceleration sensitive point when the acceleration $a_i$ within the parameter step length $\Delta u_i$ is greater than the maximum allowable acceleration and the acceleration $a_{i+n}$ within the parameter step length $\Delta u_{i+n}$ is smaller than the maximum allowable acceleration;
   dividing the curve of the maximum allowable velocity into a plurality of segments at a minimum value, determining a corresponding parameter value $u_{mid}$ according to an intermediate point of an acceleration sensitive interval of each of the velocity curve segments, and calculating a velocity value of the intermediate point;
   determining whether a parameter u corresponding to an interpolation point has entered the acceleration sensitive interval; and
   accelerating from a side point of the acceleration sensitive interval taken as a start point to the intermediate point, and decelerating from the intermediate point to another side point of the acceleration sensitive interval taken as an end point when the parameter u corresponded by the interpolation point is determined to have entered the acceleration sensitive interval, wherein an acceleration of the intermediate point is 0.

4. The method of claim 3, wherein the acceleration $a_i$ within the parameter step length $\Delta u_i$ is calculated through the following formula:

first formula:

$$a_i = \frac{v_{i+1}^2 - v_i^2}{2s_i} \approx \frac{v^2(u_i + \Delta u) - v^2(u_i)}{2\|\vec{C}(u_i + \Delta u) - \vec{C}(u_i)\|};$$

wherein $u_i$ is the parameter value of the current interpolation point, the numerator represents the velocity value, and the denominator represents using a chord segment between two of the interpolation points on the NURBS curve to replace an arc segment.

5. The method of claim 3, wherein the velocity value of the intermediate point is calculated using the following formulas:

$$V_{min} = V_m + a_m(u_{mid} - u_m);\qquad\text{second formula:}$$

$$V_{mid} = V_{m+n} + a_{m+n}(u_{mid} - u_{m+n});\qquad\text{third formula:}$$

wherein $a_m$ and $a_{m+n}$ are respectively the acceleration of two end points of the acceleration sensitive interval of the velocity curve, and $u_m$ and $u_{m+n}$ are respectively the corresponding parameters of the two end points; the value of $v_{mid}$ is the minimum value among a value calculated through the second and the third formulas and the maximum allowable velocity.

6. The method of claim 3, wherein the velocity value of the intermediate point is set as the maximum allowable velocity when the velocity value of the intermediate point is greater than the maximum allowable velocity.

7. The method of claim 5, wherein when the velocity value of the intermediate point is set as the maximum allowable velocity when the velocity value of the intermediate point is greater than the maximum allowable velocity.

8. The method of claim 3, wherein the acceleration of the start point is a slope value of the start point of the acceleration sensitive interval, an initial acceleration from the intermediate point to decelerate to another end point is 0, and an end acceleration is a slope value of an end point of the acceleration sensitive interval.

9. A numerical control machine, comprising a numerical control system, a servo motor, and an execution component, the numerical control system is configured to:
obtain numerical control machining route data with a NURBS (non-uniform rational B-splines) curve;
obtain an acceleration $a_i$ within a parameter step length $\Delta u_i$ on the NURBS curve;
compare the acceleration $a_i$ of everywhere of the NURBS curve with a maximum allowable acceleration to determine an acceleration sensitive point and determine an acceleration sensitive interval based on the determined acceleration sensitive point;
determine an intermediate point of the acceleration sensitive interval as a demarcation point of the acceleration and the deceleration within the sensitive interval;
calculate a velocity value of the intermediate point as a target velocity;
plan acceleration and deceleration of the acceleration sensitive interval based on the target velocity to obtain the numerical control machining route data with the planned NURBS curve; and receive the numerical control machining route data with the planned NURBS curve and control the execution component to perform numerical control machining according to the received numerical control machining route data through the servo motor;

wherein the comparing the acceleration of everywhere of the NURBS curve with the maximum allowable acceleration to determine the acceleration sensitive point and determining the acceleration sensitive interval based on the determined acceleration sensitive point comprises:
calculating a curvature $1/\rho_i$ of everywhere of the NURBS curve and determining a maximum allowable velocity curve based on a constraint condition of a chord height error $\delta_{max}$ and a constraint condition of a centripetal acceleration $a_{max}$; and
calculating the acceleration $a_i$ within the parameter step length $\Delta u_i$, determining an end point of the parameter step length corresponding to the acceleration with a minimum difference from the maximum allowable acceleration as the acceleration sensitive point when the acceleration $a_i$ within the parameter step length $\Delta u_i$ is greater than the maximum allowable acceleration and the acceleration $a_{i+n}$ within the parameter step length $\Delta u_{i+n}$ is smaller than the maximum allowable acceleration, and determining the acceleration sensitive interval based on the determined acceleration sensitive point.

10. The numerical control machine of claim 9, wherein the calculating the velocity value of the intermediate point comprises:
dividing the curve of the maximum allowable velocity into a plurality of segments at a minimum value, determining a corresponding parameter value $u_{mid}$ according to an intermediate point of an acceleration sensitive interval of each of the velocity curve segments, and calculating a velocity value of the intermediate point.

11. The numerical control machine of claim 10, wherein the acceleration within the parameter step length $\Delta u_i$ is calculated through the following formula:

first formula:

$$a_i = \frac{v_{i+1}^2 - v_i^2}{2s_i} \approx \frac{v^2(u_i + \Delta u) - v^2(u_i)}{2\|\vec{C}(u_i + \Delta u) - \vec{C}(u_i)\|};$$

wherein $u_i$ is the parameter value of a current interpolation point, the numerator represents the velocity value, and the denominator represents using a chord segment between two of the interpolation points on the NURBS curve to replace an arc segment; and
the velocity value of the intermediate point is calculated using the following formulas:

$$V_{min} = V_m + a_m(u_{mid} - u_m);\qquad\text{second formula:}$$

$$V_{mid} = V_{m+n} + a_{m+n}(u_{mid} - u_{m+n});\qquad\text{third formula:}$$

wherein $a_m$ and $a_{m+n}$ are respectively the acceleration of two end points of the acceleration sensitive interval of the velocity curve, and $u_m$ and $u_{m+n}$ are respectively the corresponding parameters of the two end points; the value of $v_{mid}$ is the minimum value among a value calculated through the second and the third formulas and the maximum allowable velocity.

12. The numerical control machine of claim 9, wherein the planning the acceleration and deceleration of the acceleration sensitive interval based on the target velocity to obtain the planned numerical control machining route data with the NURBS curve comprises:
  determining whether one or more parameters corresponding to an interpolation point has entered the acceleration sensitive interval; and
  accelerating from a side point of the acceleration sensitive interval taken as a start point to the intermediate point, and decelerating from the intermediate point to another side point of the acceleration sensitive interval taken as an end point when the one or more parameters corresponded by the interpolation point are determined to have entered the acceleration sensitive interval.

* * * * *